J. B. BELCHER.

Assignor of one-half to F. S. BELCHER.

BOOT STRAP.

No. 10,151. Reissued July 11, 1882.

Witnesses:
John C. Dile
George Foster

Inventor:
John B. Belcher

N. PETERS, Photo-Lithographer, Washington, D. C.

UNITED STATES PATENT OFFICE.

JOHN B. BELCHER, OF CHARLOTTE, MICHIGAN, ASSIGNOR OF ONE-HALF TO FRANK S. BELCHER, OF SAME PLACE.

BOOT-STRAP.

SPECIFICATION forming part of Reissued Letters Patent No. 10,151, dated July 11, 1882.

Original No. 254,906, dated March 14, 1882. Application for reissue filed May 29, 1882.

*To all whom it may concern:*

Be it known that I, JOHN B. BELCHER, a citizen of the United States, residing at Charlotte, in the county of Eaton and State of Michigan, have invented a new and Improved Boot-Strap, of which the following, when taken in connection with the accompanying drawings and the letters of reference, is a specification.

This invention has for its object the manufacture of a boot-strap especially applicable to rubber boots, which shall be strong, durable, and convenient.

It consists of a metallic strap or loop provided with a holder and a support, being constructed as herein recited and described.

Figure 2:
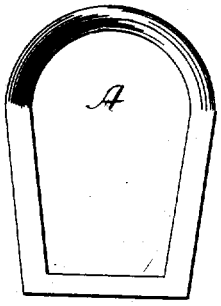
Figure 1:
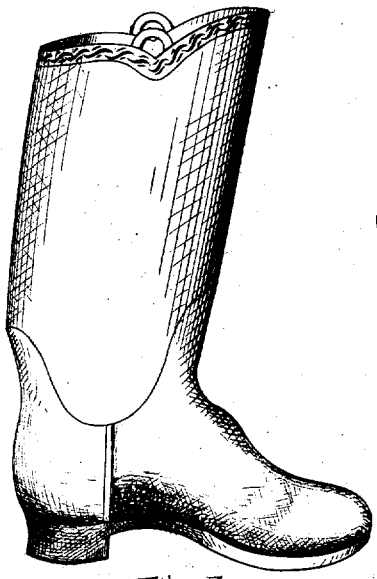
Figure 5:
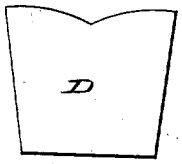
Figure 3:
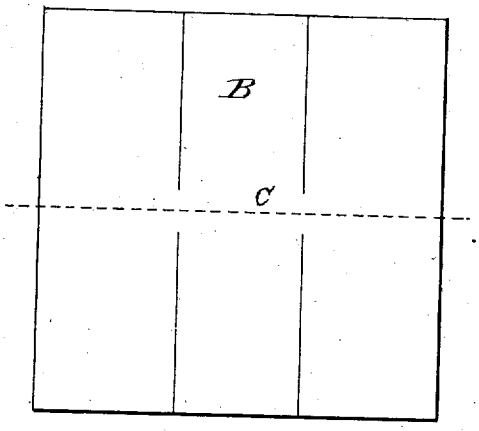
Figure 4:
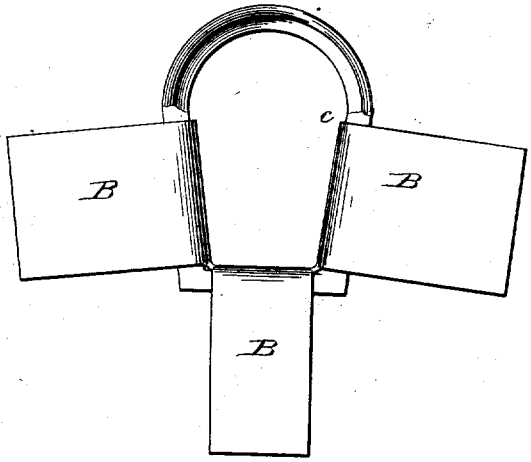

Referring to the drawings, Figure 1 is a perspective view of a rubber boot provided with my improved straps. Figs. 2 and 3 represent the metallic loop A and its holder B. Fig. 4 illustrates the arrangement of loop A and holder B before applying to the boot, and Fig. 5 the block or support D.

The metallic loop A is made with its top part rounding and smooth for the fingers, while its lower portion may be thinner and sufficiently light.

The holder B is a piece of strong cloth covered with a coating of rubber, or a combination of rubber and fabric of required dimensions, which is then slit, as shown in Fig. 3, to be folded on dotted line C, then passed through and placed around loop A, as in Fig. 4.

The support D is simply a piece cut from prepared rubber and fabric of sufficient thickness and proper size to fit inside that portion of loop A which extends below top of boot.

The loop A and holder B, being arranged as described, with the addition of support D, is attached to the boot by being placed between the boot and its lining, or, in the usual manner of attaching straps to rubber boots, with the round top portion of loop A only extending above the top of the boot.

It will be understood that the material of which the holder B and support D are composed is of such a nature or prepared so that it will adhere to the parts of the boot-leg, and so that the usual vulcanizing process will make the attachment permanent, the holder B thereby preventing loop A from working loose at either side or lower end, the support D serving as an additional stay, and also preventing any uneven appearance on outside of boot.

This strap possesses a great advantage over all stiff or upright straps for rubber boots in use, in that it is much more sightly, as the top part may have a bright or japanned finish, and it will not wear apart or become flimsy by long use, as do all other straps which are composed only of cloth and rubber or rubber and fabric.

I claim—

1. An improved boot strap and holder, consisting of the metallic loop A and holder B, constructed and adapted for use substantially as shown and described.

2. The combination of the metallic loop A, the cloth or rubber holder B, the cloth and rubber support D, and the rubber boot-leg, as and for the purpose herein described and specified.

JOHN B. BELCHER.

Witnesses:

JOHN C. FILE,

L. O. SMITH.